US008769415B2

(12) United States Patent
So et al.

(10) Patent No.: US 8,769,415 B2
(45) Date of Patent: Jul. 1, 2014

(54) APPARATUS AND METHOD FOR INTERFACING BETWEEN A REMOTE USER INTERFACE SERVER AND A REMOTE USER INTERFACE CLIENT VIA A PROXY REMOTE USER INTERFACE CLIENT

(75) Inventors: Young-Wan So, Gyeonggi-do (KR); Young-Sun Ryu, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 200 days.

(21) Appl. No.: 12/902,874

(22) Filed: Oct. 12, 2010

(65) Prior Publication Data
US 2011/0060999 A1      Mar. 10, 2011

(30) Foreign Application Priority Data

Oct. 9, 2009  (KR) ......................... 10-2009-0096469

(51) Int. Cl.
*G06F 3/00*         (2006.01)
(52) U.S. Cl.
USPC .......................................................... 715/740
(58) Field of Classification Search
USPC .......................................................... 715/740
See application file for complete search history.

(56) References Cited

U.S. PATENT DOCUMENTS

| | | | |
|---|---|---|---|
| 6,020,881 A * | 2/2000 | Naughton et al. ............. 715/740 |
| 7,734,717 B2 * | 6/2010 | Saarimaki et al. ............ 709/217 |
| 7,743,042 B2 | 6/2010 | Kim | |
| 7,912,972 B2 | 3/2011 | Park et al. | |
| 8,001,220 B2 * | 8/2011 | Lee et al. ....................... 709/220 |
| 8,291,037 B2 * | 10/2012 | Kumar .......................... 709/217 |
| 8,296,395 B2 * | 10/2012 | Kim et al. ..................... 709/219 |
| 8,316,082 B2 * | 11/2012 | Igarashi ........................ 709/203 |
| 8,327,433 B2 * | 12/2012 | Yang et al. ...................... 726/12 |
| 8,345,564 B2 * | 1/2013 | Cho et al. ...................... 370/252 |
| 8,346,943 B2 * | 1/2013 | Murakami et al. ............ 709/227 |

(Continued)

FOREIGN PATENT DOCUMENTS

| | | |
|---|---|---|
| CN | 1941729 | 4/2007 |
| CN | 101268674 | 9/2008 |

(Continued)

OTHER PUBLICATIONS

Zimmermann et al., "Universal Control Hub & Task-Based User Interfaces", URC Consortium, http://myurc.org/publications/2006-Univ-Ctrl-Hub.php, Jan. 2006.*

(Continued)

*Primary Examiner* — Stephen Hong
*Assistant Examiner* — Joseph R Burwell
(74) *Attorney, Agent, or Firm* — The Farrell Law Firm, P.C.

(57) ABSTRACT

Provided is a method and apparatus for providing a User Interface (UI) component to a second Remote User Interface Client (RUIC) incapable of directly receiving the UI component from a Remote User Interface Server (RUIS) in a first RUIC capable of directly receiving the UI component from the RUIS. In the method, the first RUIC discovers the second RUIC that will receive the UI component. Upon discovering the second RUIC, the first RUIC performs a device capability matching procedure between the RUIS and the second RUIC. After completion of the device capability matching procedure, the first RUIC provides the second RUIC with a UI component received from the RUIS and processed for the second RUIC, and delivers control information for the UI component from the second RUIC to the RUIS.

14 Claims, 7 Drawing Sheets

(56) References Cited

U.S. PATENT DOCUMENTS

| | | | |
|---|---|---|---|
| 8,375,104 | B2* | 2/2013 | Cho et al. ............. 709/219 |
| 8,379,533 | B2* | 2/2013 | Cho et al. ............. 370/252 |
| 2003/0187920 | A1* | 10/2003 | Redkar ............. 709/203 |
| 2004/0260427 | A1* | 12/2004 | Wimsatt ............. 700/275 |
| 2007/0073730 | A1 | 3/2007 | Jun |
| 2007/0089055 | A1 | 4/2007 | Ko et al. |
| 2008/0120422 | A1* | 5/2008 | Park et al. ............. 709/229 |
| 2008/0205415 | A1 | 8/2008 | Morales |
| 2009/0019058 | A1* | 1/2009 | Jung et al. ............. 707/10 |
| 2009/0193438 | A1 | 7/2009 | Jin et al. |
| 2009/0210488 | A1 | 8/2009 | Lee |
| 2010/0115053 | A1* | 5/2010 | Ryu et al. ............. 709/217 |
| 2010/0219976 | A1* | 9/2010 | Park et al. ............. 340/825.22 |
| 2010/0257455 | A1* | 10/2010 | Park et al. ............. 715/740 |
| 2010/0293598 | A1* | 11/2010 | Collart et al. ............. 726/3 |
| 2010/0306312 | A1* | 12/2010 | Ryu et al. ............. 709/203 |
| 2011/0050449 | A1* | 3/2011 | Park et al. ............. 340/825.22 |
| 2011/0055716 | A1* | 3/2011 | Kim et al. ............. 715/740 |
| 2011/0072359 | A1* | 3/2011 | So et al. ............. 715/744 |
| 2012/0159343 | A1* | 6/2012 | Park et al. ............. 715/740 |
| 2012/0159344 | A1* | 6/2012 | Park et al. ............. 715/740 |
| 2012/0192230 | A1* | 7/2012 | Algie et al. ............. 725/38 |

FOREIGN PATENT DOCUMENTS

| | | |
|---|---|---|
| EP | 1 770 934 | 4/2007 |
| JP | 2007-195187 | 8/2007 |
| JP | 2008-130082 | 6/2008 |
| JP | 2008-283670 | 11/2008 |
| WO | WO 2008/023918 | 2/2008 |
| WO | WO 2009/104908 | 8/2009 |

OTHER PUBLICATIONS

Oh et al., "The DLNA Proxy System Architecture for Sharing In-Home Media Contents via Internet", The 8th International Conference on Advanced Communication Technology (ICACT 2006), pp. 1855-1858, Feb. 20, 2006.*

Zimmermann et al., "The Universal Control Hub: An Open Platform for Remote User Interfaces in the Digital Home", J. Jacko (Ed.): Human-Computer Interaction, Part II, HCII 2007, Lecture Notes in Computer Science 4551 (LNCS 4551), pp. 1040-1049, 2007.*

Kim et al., "Implementation of the DLNA Proxy System for Sharing Home Media Contents", IEEE Transactions on Consumer Electronics, v. 53, n. 1, pp. 139-144, Feb. 2007.* de Freitas et al., "Ubiquitous Services in Home Networks offered through Digital TV", The 2009 ACM Symposium on Applied Computing (SAC '09), pp. 1834-1838, Mar. 8, 2009.*

"RVU Protocol: Networked Home Entertainment With Pixel Accurate Remote Graphics", RVU Alliance—White Paper, Rev. 5, Aug. 4, 2009.*

Park et al. (Samsung Electronics), "A Unified Gateway for Home-Networking Environments", 13th IASTED International Conference on Internet and Multimedia Systems and Applications 2009 (IMSA 2009), pp. 131-136, Aug. 17, 2009.*

"Remote User Interface Technology", RVU Alliance—Technical Brief, Oct. 28, 2010.*

\* cited by examiner

APPARATUS AND METHOD FOR INTERFACING BETWEEN A REMOTE USER INTERFACE SERVER AND A REMOTE USER INTERFACE CLIENT VIA A PROXY REMOTE USER INTERFACE CLIENT

PRIORITY

This application claims priority under 35 U.S.C. §119(a) to a Korean Patent Application filed in the Korean Intellectual Property Office on Oct. 9, 2009 and assigned Serial No. 10-2009-0096469, the entire disclosure of which is incorporated herein by reference.

BACKGROUND OF THE INVENTION

1. Field of the Invention

The present invention relates generally to Internet Protocol (IP)-based home networking, and more particularly, to a method and apparatus for providing a remote User Interface (UI) to a Remote User Interface Client (RUIC) that cannot directly receive a service from a Remote User Interface Server (RUIS).

2. Description of the Related Art

A home network, comprised of an IP-based private network, connects all types of devices used in a home, such as Personal Computers (PCs), intelligent products and wireless devices, into one network through a common virtual computing environment called middleware to control the devices.

Middleware refers to a technology for connecting various digital devices in a peer-to-peer (P2P) manner to enable communication between the devices. Many industry standards organizations, such as Digital Living Network Alliance (DLNA), Home AV Interoperability (HAVI), Universal Plug and Play (UPnP), Java Intelligent Network Infrastructure (Jini) and Home Wide Web (HWW), have studied middleware technology to improve the home network technology.

In a home network, a Remote UI (RUI) technology may be used to allow one device to control functions or capabilities of other devices. In brief, the RUI technology is a client-server architecture-based technology, in which an RUIC acquires a UI(s) from an RUIS so that a user may control the RUIS through the UI on the RUIC.

This RUI technology is a mechanism for rendering and controlling a UI for controlling an application, not on the device running the application, but on other devices. Various RUI technologies are under study, such as Consumer Electronics Association (CEA)-2014, eXpandable Home Theater (XHT), Widget Description Exchange Service (WiDeX), and Remote Desktop Protocol (RDP).

Now, a description will be made of CEA-2014, a typical RUI technology for controlling physically separated devices. A remote control system implementing CEA-2014 technology includes an RUIS providing UI(s) for remote control, and RUIC(s) for displaying a remotely received UI.

The RUIS providing a UI for remote control has a web server in it. Through this web server, the RUIS delivers a web page requested by an RUIC, and the RUIC displays the web page of a UI on an XHTML browser, for the user.

By using this RUI technology, an RUIC may set up a session with an RUIS and receive UI components from the RUIS, making it possible to control the RUIS. The UI components indicate elements constituting the UI, and refer to all types of data provided from the RUIS to the RUIC on an RUI session, such as icons, pull-down menus, buttons, scroll bars, windows, texts, and A/V data (audio/video, photo, etc.).

FIG. 1 shows a general example in which two client devices RUIC1 and RUIC2 access content, using the remote UI page and control information provided by RUIS 100. While an RUIC1 101 can directly receive a remote UI (RUI) page and content from the RUIS 100, another RUIC2 102 cannot directly receive a service from the RUIS 100 as shown by reference numeral 103. This situation may occur due to various reasons, such as the RUIC2 102 being positioned where its direct connection to the RUIS 100 is physically impossible, or the RUIC2 102 has no access rights to directly receive a remote UI page and content from the RUIS 100 even though its connection is possible. In this environment, use of the remote UI is very limited, but the remote UI service may be provided even to the RUIC2 102 by making good use of other neighboring devices such as, 3G terminals or devices capable of connecting with the RUIS 100.

Furthermore, in a convergence environment, where not only mobile communication terminals, but also devices having various capabilities, such as a Digital TV (DTV), a Portable Media Player (PMP) and a PC, coexist and provide services to the user, even the devices supporting remote UI may have different types of physical channel interfaces. For example, while a TV has a built-in Wireless Fidelity (WiFi)-based wireless LAN interface, all other devices in a home may have only a Bluetooth® interface, supporting the remote UI through the Bluetooth® interface. In this case, currently, there is no way to provide the remote UI service to the TV. If a multi-interface device having both the Bluetooth® and WiFi interfaces can provide the remote UI service on behalf of the devices, it would be more advantageous in the convergence environment.

The conventional method of providing the remote UI service only when the RUIS and the RUIC have direct connection has several disadvantages as stated above. To overcome these and other limitations of the conventional remote UI providing method, there is a need for a method of providing a remote UI page and content to the RUIC2 102, or to another RUIC incapable of service reception, using the RUIC1 101 capable of directly receiving a service from the RUIS 100.

SUMMARY OF THE INVENTION

An aspect of the present invention is to address at least the above-mentioned problems and/or disadvantages and to provide at least the advantages described below. Accordingly, an aspect of the present invention is to provide a method and apparatus for providing a remote UI page and content to an RUIC device incapable of directly connecting with an RUIS, through an RUIC device capable of directly receiving a remote UI page and content from the RUIS.

In accordance with one aspect of the present invention, there is provided a method for providing a User Interface (UI) component to a second Remote User Interface Client (RUIC2) incapable of directly receiving the UI component from a Remote User Interface Server (RUIS) in a first RUIC (RUIC1) capable of directly receiving the UI component from the RUIS. In this method, the first RUIC discovers the second RUIC that will receive the UI component. Upon discovering the second RUIC, the first RUIC performs a device capability matching procedure between the RUIS and the second RUIC. After completion of the device capability matching procedure, the first RUIC provides the second RUIC with a UI component received from the RUIS and processed for the second RUIC, and delivers control information for the UI component from the second RUIC to the RUIS.

According to another aspect of the present invention, there is provided a first Remote User Interface Client (RUIC)

device for providing a User Interface (UI) component to a second RUIC incapable of directly receiving the UI component from a Remote User Interface Server (RUIS). In this device, a UI control module performs a device capability matching procedure between the RUIS and the second RUIC upon discovering the second RUIC that will receive the UI component. A remote UI page manager receives the UI component from the RUIS, and if the device capability matching procedure is completed, delivers to the second RUIC a UI component received from the RUIS and processed for the second RUIC. A message relay unit delivers control information for the UI component from the second RUIC to the RUIS.

BRIEF DESCRIPTION OF THE DRAWINGS

The above and other aspects, features and advantages of the embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

The above and other aspects, features and advantages of the present invention and a method for achieving them will be more apparent from the following description taken in conjunction with the accompanying drawings. However, in the following description, specific details such as detailed configuration and components are merely provided to assist the overall understanding of the present invention. Therefore, it should be apparent to those skilled in the art that various changes and modifications of the embodiments described herein can be made without departing from the scope and spirit of the invention.

Figure 1:
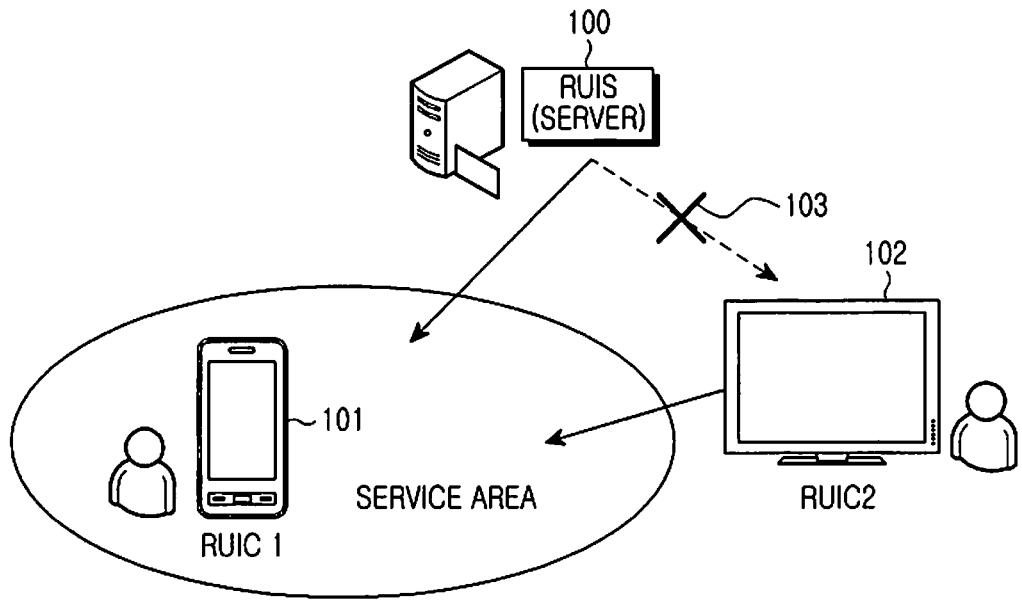
FIG. 1 is a diagram showing a general example in which an RUIS delivers a remote UI page and content to an RUIC1 and another RUIC.
Figure 2:
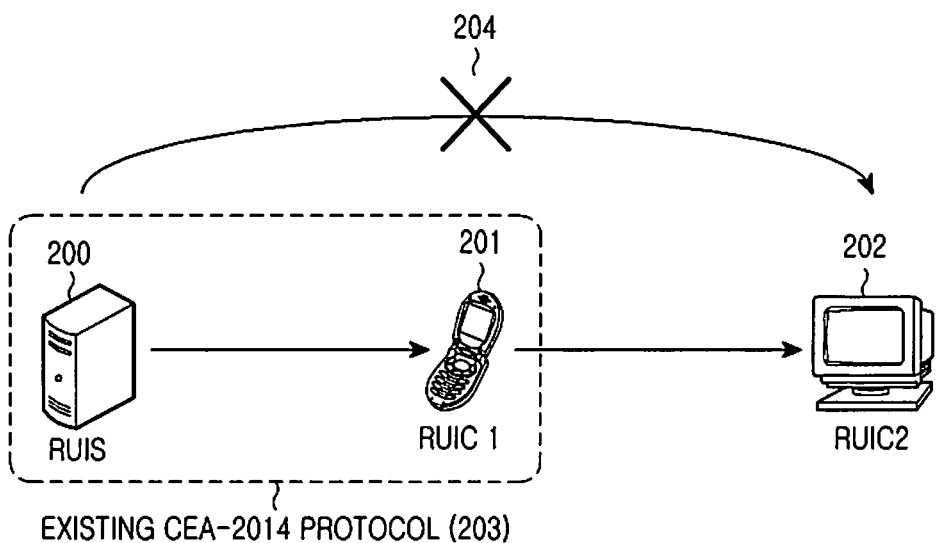
FIG. 2 is a diagram showing an example of delivering a remote UI page and content via a proxy RUI device so that another RUIC may render them, according to an embodiment of the present invention.

FIG. 2 shows an example in which the remote UI page and/or content provided by an RUIS 200 is provided to an RUIC2 202, or another RUIC device, via an RUIC1 201, or a proxy RUI device, according to an embodiment of the present invention. As for the proxy RUI device, the RUIC1 201 may be called a proxy RUI device, since the RUIC1 201 performs communication with the RUIS 200 on behalf of the RUIC2 202.

As shown in FIG. 2, if the RUIC2 202 cannot directly connect with the RUIS 200, the RUIS 200 remotely delivers the remote UI page and/or content, which should be delivered to the RUIC2 202 incapable of communication with the RUIS 200 as shown by reference numeral 204, to the RUIC2 202 via the RUIC1 201. The remote UI page and content are delivered to the RUIC2 202, or another device incapable of communication with the RUIS 200, via the RUIC1 201, and the remote UI page and content received from the RUIS 200 are displayed on a screen of the RUIC2 202. To this end, if a user, who was consuming content on the RUIC1 201, first searches for and selects the RUIC2 202 to which the user will provide content or a remote UI, and then selects the content or UI page the user will provide to the RUIC2 202, then the selected content or remote control UI is delivered to the RUIC2 202.

Figure 3:
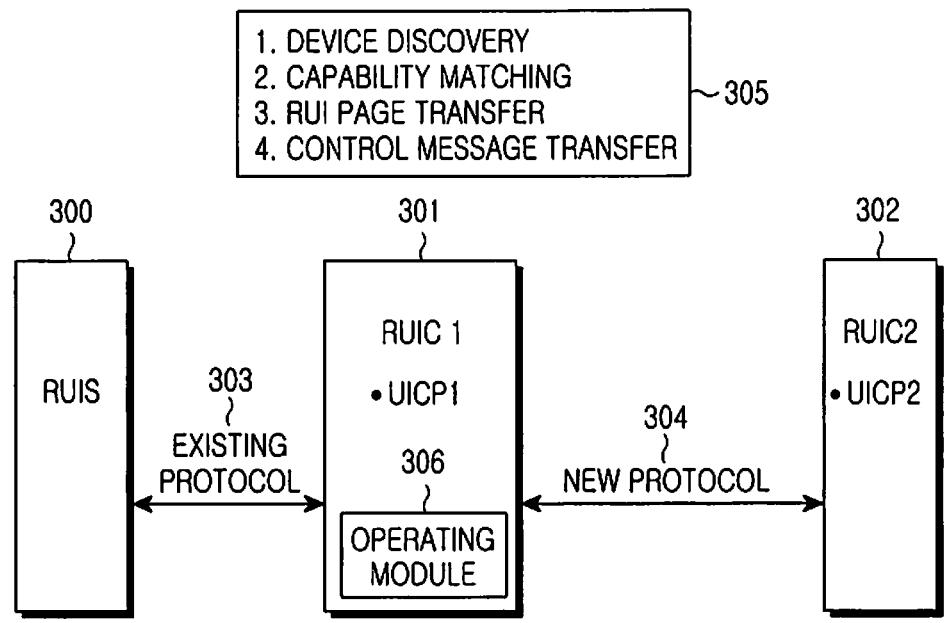
FIG. 3 is a diagram defining a protocol and procedure needed to deliver a remote UI page and content to another RUIC device according to an embodiment of the present invention.

FIG. 3 shows a protocol 304 and a procedure 305 needed to provide a remote UI page or content to an RUIC2 302, or another device incapable of communication with the RUIS, through an RUIC1 301, and an operating module 306 in the RUIC1 301 taking charge of procedure 305, according to an embodiment of the present invention. The RUIC1 301 receives a remote UI page and content from an RUIS 300 through an existing protocol 303 such as CEA-2014. However, in order for the proxy RUIC1 301 to provide the remote UI page and content to the RUIC2 302 or another RUIC device, a new protocol 304 capable of delivering the remote UI page and content should be defined between the RUICs 301 and 302. Details that should be defined in the new protocol 304 according to the present invention are as follows.

First, a Device Discovery process is needed, in which the RUIC1 301 discovers the RUIC2 302 or another RUIC device. Second, a Device Capability Matching process is needed, in which after discovering the RUIC2 302, the RUIC1 301 acquires, from the RUIC2 302, information needed to acquire a remote UI page and content from the RUIS 300 and compares the acquired information. Third, a RUI Page Transfer process is needed, in which the RUIC1 301 delivers a remote UI page and content to the RUIC2 302, upon recognizing that the RUIC2 302 can render the remote UI page and content. Fourth, a Control Message Transfer process is needed, in which upon receiving a remote UI from the RUIC1 301, the RUIC2 302 renders the RUI page received from the RUIC1 301 and then sends a control message through the RUIC1 301.

Now, a description will be made of procedures for performing these processes in the RUIC1 301.

Figure 4:
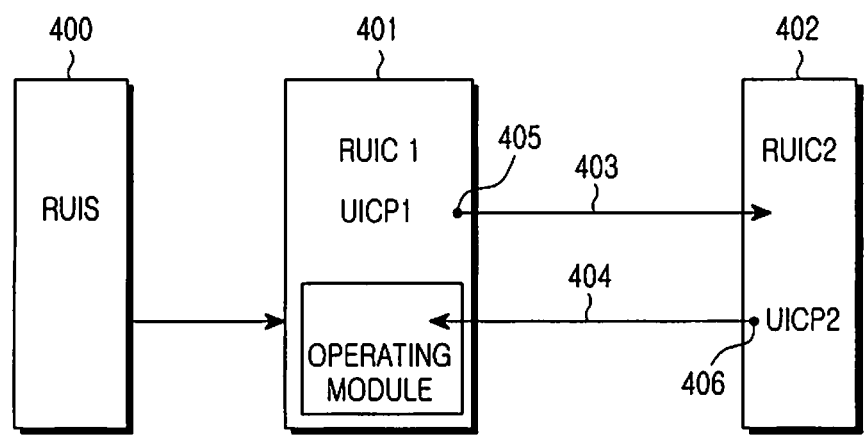
FIG. 4 is a diagram showing a method in which a proxy RUIC and another RUIC device discover each other, according to an embodiment of the present invention.

FIG. 4 shows a method in which an RUIC1 401 and an RUIC2 402 discover each other to provide a remote UI page and content to the RUIC2 402 according to an embodiment of the present invention. In an embodiment of the present invention, the RUIC1 401 and the RUIC2 402 discover each other in any one of two different methods: a PULL mode and a PUSH mode.

In the PUSH mode method 403, the RUIC1 401 discovers the RUIC2 402. The PUSH mode may be activated when a user of the RUIC1 401, for example, was enjoying video content received from the RUIS 400 and wants to view the content using the RUIC2 402 or a neighboring device, a screen size of which is greater than that of the RUIC1 401.

The User Interface Control Point 1 (UICP1) 405 is used as a UICP controlling the RUIC1 401 and will perform the procedure, in which the RUIC1 401 discovers the RUIC2 402. The RUIC1 401 discovers all of its neighboring RUICs and determines whether the discovered RUIC2 402 is a device capable of content reception depending on metadata. The metadata may include device description data or capability description data, and has a value based on which the RUIC1 401 can determine whether the discovered RUIC2 402 can receive content provided from the RUIS 400.

Table 1 below shows an example of adding a specific flag in device description metadata according to an embodiment of the present invention. The flag is used to allow the RUIC1 401 to determine whether the RUIC2 402 is a device capable of content reception. Table 1 shows an example of device description metadata written in an Extensible Markup Language (XML). In Table 1, the part emphasized in bold italics corresponds to the flag added according to an embodiment of the present invention, and the data of Table 1 is delivered through a device description in step 806 of FIG. 8 or step 906 of FIG. 9. The RUIC1 401 uses the flag to select only the RUIC2 402 that wants to receive, or has a capability to receive a remote UI page and content, and the flag may be set depending on the preference of or the decision by a user of the RUIC2 402. Based on the metadata for the discovered RUIC2 402, the RUIC1 401 determines whether the RUIC2 402 is a device capable of content consumption, and if so, enters a device capability matching procedure for determining whether it can transmit a remote UI page and content.

The device capability matching procedure is performed by the UICP1 405 in the RUIC1 401. However, for convenience' sake, the matching procedure will be referred to as being performed by the RUIC1 401. After receiving both device descriptions for the RUIS 400 and the RUIC2 402, the UICP1 405 in the RUIC1 401 compares the two device descriptions, and then determines which of the several RUI pages provided by the RUIS 400 the RUIC2 402 can receive. Thereafter, the RUIC1 401 requests the RUIS 400 to provide the RUI page that should be delivered to the RUIC2 402 in an unspecified manner. This request message carries information about a device capability of the RUIC2 402 along with an RUI page request.

In short, in an embodiment of the present invention, the device capability matching procedure includes a step in which the RUIC1 401 acquires information about device capabilities from device descriptions for the RUIS 400 and the RUIC2 402, respectively, a step in which the RUIC1 401 compares the acquired information of the device descriptions, a step in which the RUIC1 401 determines which of the services provided by the RUIS 400 the RUIC2 402 can receive, and a step in which the RUIC1 401 delivers a profile of the RUIC1 401 and a profile of the RUIC2 402 to the RUIS 400 along with a UI page request.

If the RUIC2 402 transmits the flag of <rui:ProxyAvailability> to the RUIC1 401 after setting it to "True" as shown in Table 1, the RUIC1 401 may determine that the RUIC2 402 is a device capable of receiving a UI component(s) provided from the RUIC1 401.

Alternatively, the RUIC1 401 may send the RUIC2 402 a discovery message including information indicating that it is searching for only the RUIC2 402, or another RUIC that wants to access content by means of the RUIC1 401. For example, the RUIC1 401 may insert target information "ST: urn:schemas-upnp-org:device:RemoteUIClientDevice:1" indicating that it is searching for only the RUIC devices, into a Search Target (ST) field in an UPnP discovery message, and send the UPnP discovery message with the status information being set, emphasized in bold italics, as shown in Table 2 so that among the searched RUICs, only the RUIC2 402, which can access content through the RUIC1 401, responds to the UPnP discovery message.

Then, only the RUIC2 402 desiring to receive content or a remote UI page delivered by the RUIC1 401 sends a response message to the RUIC1 401 in response to the request. Upon receiving the response message, the RUIC1 401 parses a device description for the RUIC2 402 that sent the response message, and then enters a device capability matching process for parting a device capability description. As described above, the device capability matching process is for determining whether the RUIC2 402 discovered by the RUIC1 401 can correctly receive and access the content or remote UI page.

Table 2 below shows an example of adding the status information, emphasized in bold italics, the RUIC2 402 should have in an UPnP discovery message according to an embodiment of the present invention, and the status information is set such that only the RUIC2 402, which can receive a remote UI page or content, responds to the UPnP discovery message. The data of Table 2 is delivered in step 805 of FIG. 8 or step 905 of FIG. 9.

TABLE 2

M-SEARCH * HTTP/1.1
HOST: 239.255.255.250:1900
MAN: "ssdp:discover"
MX: seconds to delay response
ST: urn:schemas-upnp-org:device: RemoteUIClientDevice:1
*ST_STATUS: AVAILABLE*
USER-AGENT: OS/version UPnP/1.1 product/version In the PULL mode method 404 the RUIC2 402 discovers the RUIC1 401. The PULL mode may be activated when, while using the RUIC2 402, for example, a user desiring to receive a specific service has recognized that the user cannot directly receive the service from the RUIS 400. Then, the

TABLE 1

```
<device xmlns:rui="urn:schemas-ce-org:cea2014-client-ext-1-0">
    <deviceType>urn:schemas-upnp-org:device:RemoteUIClientDevice:1</deviceType>
    <friendlyName>short user-friendly device name</friendlyName>
    <manufacturer>manufacturer name</manufacturer>
    <presentationURL>URL for presentation</presentationURL>
    ......
    <rui:uiClientInfo>...
      *<rui:ProxyAvailability> True </rui: ProxyAvailability>*
        <rui:connectCommandURL> http://.... </rui:connectCommandURL>
</device>
```

UICP2 406 is used as a UICP controlling the RUIC2 402 and will perform a procedure for determining whether there is any neighboring RUIC1 401 it can use as its proxy RUIC. The information for notifying the RUIC2 402 whether the RUIC1 401 can operate as a proxy RUIC should be expressed in the device's description.

Tables 3 and 4 below show examples of adding specific information in a device description, implemented in XML, according to an embodiment of the present invention, the specific information indicating whether or not the RUIC1 401 supports a proxy RUI. According to an embodiment of the present invention, the RUIC1 401 generates the information of Tables 3 and 4, and transmits the generated information to the RUIC2 402. In Table 3, a new device type 'ProxyRUIDevice,' emphasized in bold italics, is defined based on which the RUIC2 402 may discover the RUIC1 401 operating as a proxy RUI. In the example of Table 4, rather than defining a new device type, a separate tag, emphasized in bold italics, indicating whether the RUIC1 401 supports a proxy RUI is described in Client Information defined in a device descriptor. Using Table 3 or 4, the RUIC1 401 informs the RUIC2 402 that the RUIC1 401 is a device capable of being used as a proxy, and upon receiving the data of Table 3 or 4, the RUIC2 402 may be aware of the presence of another device it will use as a proxy. After receiving the data of Table 3 or 4, the RUIC2 402 performs a procedure of receiving from the RUIC1 401 a list of services it can receive, and its detailed method will be described later in detail.

Figure 5:
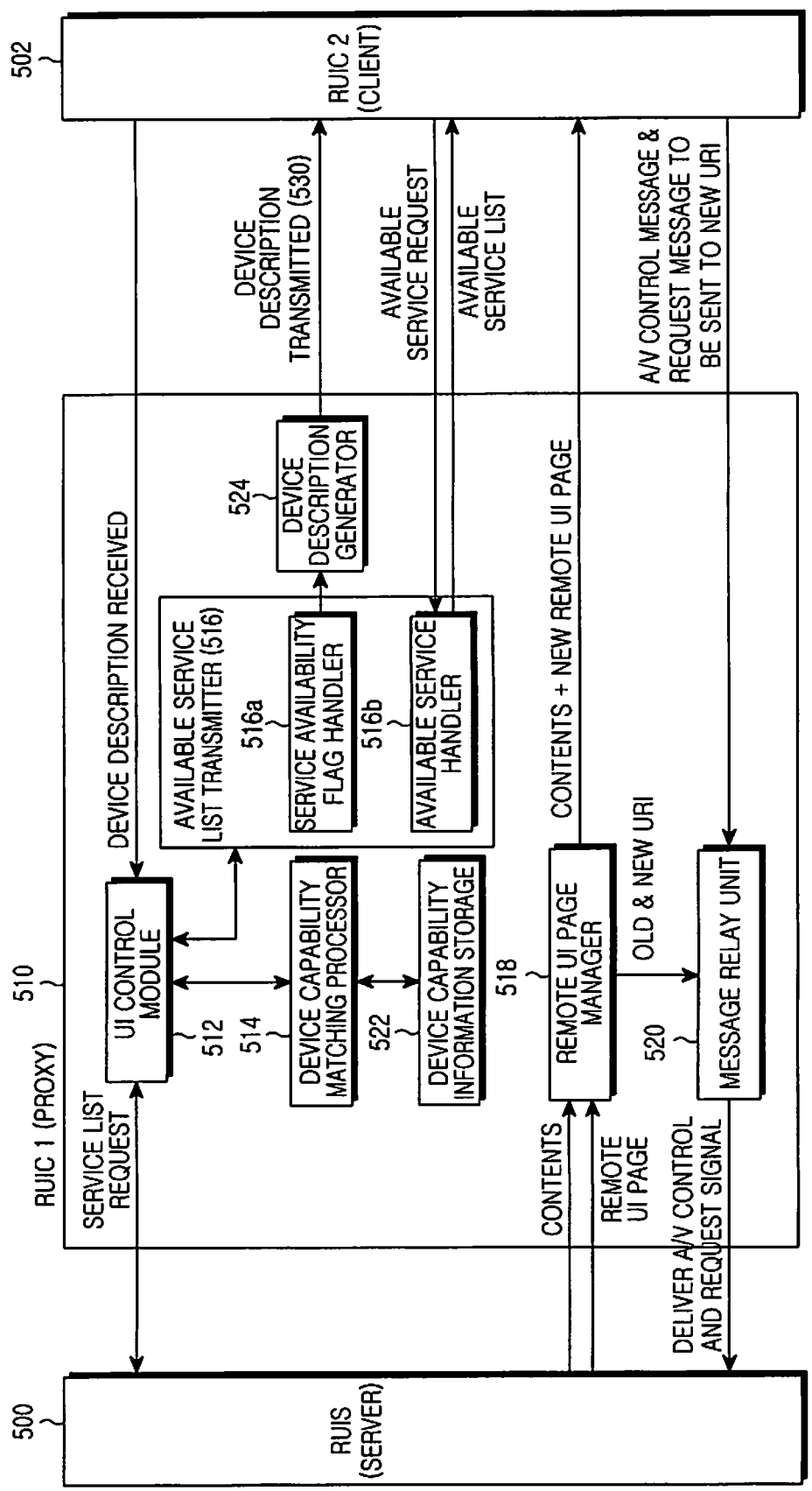
FIG. 5 is a block diagram of an RUIC1 510 providing a remote UI and content between an RUIS 500 and an RUIC2 502 according to an embodiment of the present invention.

FIG. 5 shows a block diagram of an RUIC1 510 providing a remote UI and content between an RUIS 500 and an RUIC2 502 according to an embodiment of the present invention.

An Available Service List (ASL) transmitter 516 delivers, to the RUIC2 502, specific information indicating that the RUIC1 510 is a device operating as a proxy RUI on behalf of the RUIC2 502, and also delivers, to the RUIC2 502, information about a list of services it can provide to the RUIC2 502.

Tables 5, 6 and 7 below show two different examples of a method for delivering to the RUIC2 502 a list of services that can be provided through the RUIC1 510. Table 5 shows a method of describing a service list URL 'serviceListURL,' emphasized in bold italics, or an address where the service list can be received, in a device description for the RUIC1 510. The RUIC2 502 may obtain a service list described in a separate XML file of Table 6, from the serviceListURL address.

Table 7 shows a method in which the RUIC1 510 directly describes a service list, emphasized in bold italics, in a device description for the RUIC1 510, and then delivers it to the RUIC2 502.

TABLE 3

```
<device xmlns:rui="urn:schemas-ce-org:cea2014-client-ext-1-0">
    <deviceType>urn:schemas-upnp-org:device:RemoteUIClientDevice:1</deviceType>
    <deviceType>urn:schemas-upnp-org:device:ProxyRUIDevice:1</deviceType>
    ...
    <friendlyName>short user-friendly device name</friendlyName>
    <manufacturer>manufacturer name</manufacturer>
    <iconList>
    ......
```

TABLE 4

```
<device xmlns:rui="urn:schemas-ce-org:cea2014-client-ext-1-0">
    <deviceType>urn:schemas-upnp-org:device:RemoteUIClientDevice:1</deviceType>
    <friendlyName>short user-friendly device name</friendlyName>
    <manufacturer>manufacturer name</manufacturer>
    <iconList> .... </iconList>
    <presentationURL>URL for presentation</presentationURL>
    ......
    <rui:uiClientInfo>...
        </rui:ProxyFlag> True </rui: ProxyFlag>
        <rui:connectCommandURL> http://.... </rui:connectCommandURL>
        <rui:disconnectCommandURL> http://.... </rui:disconnectCommandURL>
        <rui:profilelist>
            <rui:ui_profile name="SD_UIPROF"/>
            <rui:audio_profile name="MP3" type="audio/mpeg"/>
            <rui:video_profile name="MPEG_PS_NTSC" type="video/mpeg"/>
        </rui:profilelist>
    </rui:uiClientInfo>
    ...
    <serviceList>
        <!-- the service list includes the service RUIClient:1 [22] for Level 2 Remote UI Client-->
        <service>
            <serviceType>urn:schemas-upnp-org:service:RemoteUIClient:1</serviceType>
            <serviceId>urn:upnp-org:serviceId:RemoteUIClient1</serviceId>
            <SCPDURL>http://.... <!-- URL to service description --> </SCPDURL>
            <controlURL>http://... <!-- URL for control --> </controlURL>
            <eventSubURL>http://... <!-- URL for eventing --> </eventSubURL>
        </service>
    </serviceList>
</device>
```

TABLE 5

```
<device xmlns:rui="urn:schemas-ce-org:cea2014-client-ext-1-0">
    <deviceType>urn:schemas-ce-org:device:RemoteUIClientDevice:1</deviceType>
    <friendlyName>short user-friendly device name</friendlyName>
    <manufacturer>manufacturer name</manufacturer>
    <iconList> ......</iconList>
      ......
    <rui:uiClientInfo>...
        <rui:connectCommandURL> http://.... </rui:connectCommandURL>
        <rui:disconnectCommandURL> http://.... </rui:disconnectCommandURL>
        <rui:serviceListURL> http://.... </rui:serviceListURL>
        <rui:profilelist>
        <rui:ui_profile name="SD_UIPROF"/>
        <rui:video_profile name="MPEG_PS_PAL" type="video/mpeg"/>
        </rui:profilelist>
    </rui:uiClientInfo>
    <serviceList/>
</device>
```

TABLE 6

```
<?xml version="1.0" encoding="UTF-8"?>
<serviceList xmlns="urn:schemas-upnp-org:remoteui:serviceList-1-0"
xmlns:xsi=http://www.w3.org/2001/XMLSchema-instance    xsi:schemaLocation="urn:schemas-upnp-
    org:remoteui:serviceList-1-0 CompatibleUIs.xsd">
  <ui>
    <uiID>4560-9876-1265-8758</uiID>
    <name>Music player</name>
    <description>Music browsing and playback application</description>
    <protocol shortName="CE-HTML-1.0">
      <uri>http://1.3.4.5:5910/</uri>
      <protocolInfo>
        <relatedData xmlns="urn:schemas-ce-org:ce-html-server-caps-1-0"
            xsi:schemaLocation="urn:schemas-ce-org:ce-html-server-caps-1-0 ServerProfiles.xsd">
            <profileList>
                <ui_profile name="SD_UIPROF">
                    <ext> <tls>true</tls> </ext>
                </ui_profile>
                <audio_profile name="MP3" type="audio/mpeg"/>
                <video_profile name="MPEG_PS_PAL" type="video/mpeg"/>
            </profilelist>
        </relatedData>
      </protocolInfo>
    </protocol>
  </ui>
</serviceList>
```

TABLE 7

```
<device xmlns:rui="urn:schemas-ce-org:cea2014-client-ext-1-0">
    <deviceType>urn:schemas-upnp-org:device:RemoteUIClientDevice:1</deviceType>
    <friendlyName>short user-friendly device name</friendlyName>
    <manufacturer>manufacturer name</manufacturer>
    <iconList> ......</iconList>
    <presentationURL>URL for presentation</presentationURL>
    ......
    <rui:uiClientInfo>...
        <rui:connectCommandURL>http://...</rui:connectCommandURL>
        <rui:disconnectCommandURL>http://.... </rui:disconnectCommandURL>
        <rui:profilelist>
            <rui:ui_profile name="MD_UIPROF"/>
            <rui:ui_profile name="SD_UIPROF"/>
            <rui:audio_profile name="MP3" type="audio/mpeg"/>
            <rui:video_profile name="AVC_MP4_BL_CIF15_AAC_520" type="video/mp4"/>
            <rui:video_profile name="MPEG_PS_NTSC" type="video/mpeg"/>
        </rui:profilelist>
    </rui:uiClientInfo>
    ...
    <serviceList>
      <ui>
        <uiID>4560-9876-1265-8758</uiID>
        <name>Music player</name>
        <description>Music browsing and playback application</description>
        <protocol shortName="CE-HTML-1.0">
            <uri>http://1.3.4.5:5910/</uri>
```

TABLE 7-continued

```
<protocolInfo>
    <relatedData xmlns="urn:schemas-ce-org:ce-html-server-caps-1-0"
        xsi:schemaLocation="urn:schemas-ce-org:ce-html-server-caps-1-0
ServerProfiles.xsd">
            <profileList>
                <ui_profile name="SD_UIPROF">
                    <ext> <tls>true</tls> </ext>
                </ui_profile>
                <audio_profile name="MP3" type="audio/mpeg"/>
                <video_profile name="MPEG_PS_PAL" type="video/mpeg"/>
            </profilelist>
        </relatedData>
    </protocolInfo>
</protocol>
</ui>
</serviceList>
...
</device>
```

A UI control module 512, which is referred to as a UICP described in the CEA-2014 standard, may be included either inside or outside the RUIC1 510. According to an embodiment of the present invention, the UI control module 512 discovers the RUIC2 502 capable of receiving a UI page or content provided from the RUIS 500, identifies device capabilities of the discovered RUIC2 502 and the RUIC1 510, and then performs a device capability matching procedure. According to an embodiment of the present invention, upon receiving a device description from the RUIC2 502, the UI control module 512 compares the device capabilities of the RUIS 500 and the RUIC2 502, and performs a device capability matching procedure. After the device capability matching procedure is completed, the RUIC1 510 may operate as a proxy for the RUIC2 502. That is, the UI control module 512 performs a process of receiving a device description from the RUIC2 502, and connecting the RUIC2 502 to the RUIS 500 by performing a device capability matching procedure between the RUIS 500 and the RUIC2 502 based on the received device description.

The ASL transmitter 516 provides necessary information when the RUIC1 510 operates in the PULL mode represented by reference numeral 404. That is, the user, who was using the RUIC2 502, checks the presence/absence of any neighboring device he can use as a proxy RUIC, and in case of the presence, may receive a list of available services from the RUIC1 510 when the user desires to know the types of available services. In the case where the UICP cannot find the RUIS because the RUIS exists outside the home, the RUIC may store an address of the RUIS one by one like a bookmark, referred to as an i-Box model. In the i-Box model, when the user wants to receive a service designated in a bookmark in the RUIC2 502, the ASL transmitter 516 serves to request the service. The ASL transmitter 516 includes a service availability flag handler 516a and an available service handler 516b.

The service availability flag handler 516a generates specific information for indicating whether the RUIC1 510 operates as a proxy RUIC for the RUIC2 502, and provides the information to a device description generator 524. The device description generator 524 inserts the specific information into a device description message and sends the device description message to the RUIC2 502. Since it is assumed that the RUIC1 510 can operate as a proxy, the service availability flag handler 516a may generate a flag notifying that the RUIC1 510 can operate as a proxy, and transmit the generated flag to the device description generator 524, if the RUIC1 510 operates.

In FIG. 5, a flag indicating whether the RUIC1 510 can provide a proxy service to the RUIC2 502 is transmitted using a device description message as shown by reference numeral 530. That is, the service availability flag handler 516a provides the generated flag to the device description generator 524, and the device description generator 524 inserts the received flag into a device description, and transmits the device description to the RUIC2 502.

Therefore, upon receiving the flag indicating that the RUIC1 510 is a proxy, the RUIC2 502 may determine that its neighboring RUIC1 510 can operate as a proxy.

In the PULL mode of the present invention, after a user of the RUIC2 502 searches for any neighboring devices capable of operating as a proxy RUIC and selects the RUIC1 510, the available service handler 516b provides the RUIC2 502 with a list of services that the RUIC1 510 can provide. If the RUIC2 502 sends a request for an available service list to the RUIC1 510, the available service handler 516b acquires a list of services the RUIS 500 can provide, from the UI control module 512, and delivers the acquired service list to the RUIC2 502.

The process, in which the service availability flag handler 516a provides the flag indicating supportability of the proxy service and the list of services available for the RUIC2 502, may be performed in the discovery process between the RUIC1 510 and the RUIC2 502.

A device capability matching processor 514 serves to receive and manage device capability information of the RUIC2 502 so that a remote UI page or content agreeable with the device capability of the RUIC2 502 may be delivered. Based on the received device capability information, in order to receive the content rendered by RUIC2 502, from the RUIS 500, the RUIC1 510 performs device capability matching with the RUIS 500 by properly combining device profile information. The device profile information, which is information about the device capabilities of the RUIC1 510 and the RUIC2 502, is stored in the device capability information storage 522.

For example, when both the content and the remote UI page are to be rendered in the RUIC2 502, all of a UI profile ui_profile, a video profile video_profile and an audio profile audio_profile, which are capability-related information, undergo device capability matching with use of the device profile information of the RUIC2 502. For example, the UI profile represents information about the presence/absence of a pointing device, a keyboard type, a UI page's size, etc. The video profile represents information about a resolution, the number of pixels, etc. The audio profile represents information about the number of audio file's channels (2 channels, 5.1 channel files, etc.), a voice codec, etc.

As used herein, the term 'device capability' refers to information related to the device for visually and acoustically providing a remote UI page or content, such as the resolution, the number of colors, the number of audio channels, etc. that the RUIC can provide. However, in the case where the remote UI page is accessed only in the RUIC1 510 and the content is accessed only in the RUIC2 502, ui_profile uses profile information of the RUIC1 510 and video_profile and audio_profile use profile information of the RUIC2 502 in undergoing device capability matching. This process will be described again in detail with reference to FIGS. 8 and 9.

A remote UI page manager 518 reconstructs a remote UI page to be delivered to the RUIC2 502, and retransmits the remote UI page. Even though the RUIS 500 has provided a remote UI page for the RUIC2 502 to be agreeable with the capability of the RUIC2 502, the RUIC2 502 cannot directly send a UI page control message for the remote UI page to the RUIS 500, since the RUIC2 502 is incapable of directly accessing the RUIS 500. Therefore, before retransmitting the remote UI page received from the RUIS 500 to the RUIC2 502, the remote UI page manager 518 in the RUIC1 510 changes the remote UI page and transmits the changed remote UI page to the RUIC2 502 so that the RUIC2 502 may send the control message to the RUIC1 510.

The detailed structure of the remote UI page manager 518 will be described with reference to FIG. 6. The remote UI page manager 518 receives from the RUIS 500 the content that is processed to be agreeable with the device capability of the RUIC1 510 or the RUIC2 502. That is, after the device capability matching procedure, the content is processed according to the capability of the device to which the content is to be provided, and then delivered from the RUIS 500 to the RUIC1 510. The 'processed content' as used herein refers to, for example, content to be transmitted to the RUIC2 502, which has been changed in the RUIS 500 to be agreeable with the device capability of the RUIC2 502, such as a resolution supportable by the RUIC2 502. If a remote UI page received from the RUIS 500 should be delivered to the RUIC2 502, the remote UI page manager 518 converts a Uniform Resource Identifier (URI) address of the RUIS 500, to which control information of the received remote UI page is to be delivered, into its own URI address, and transmits to the RUIC2 502 a new remote UI page processed to be agreeable with the RUIC2 502.

A message relay unit 520 receives control messages and various other request messages being sent by the RUIC2 502, and then sends them to their original target server or the RUIS 500. To this end, the message relay unit 520 receives, from the remote UI page manager 518, information indicating to which URI the message received from the RUIC2 502 should have been originally sent, and then transmits the message to its original target RUTS 500 or a separate content server (not shown). That is, to send a control message or request message received from the RUIC2 502 to the RUIS 500 or an intended server, the message relay unit 520 replaces a URI of the control message or request message.

The reason that the remote UI page manager 518 is needed is because the RUIS 500 and the RUIC2 502 cannot directly communicate with each other, even though a URI address of the remote UI page or content received from the RUIS 500 is set to an address of the RUIS 500 when the remote UI page or content is delivered to the RUIC2 502, control information corresponding thereto may not be directly transmitted from the RUIC2 502 to the RUIS 500. Therefore, there is a need for a process of converting a URI address of a UI component, which is received from the RUIS 500 and to be transmitted to the RUIC2 502, into an address of the RUIC1 510 supporting a proxy service.

Figure 6:
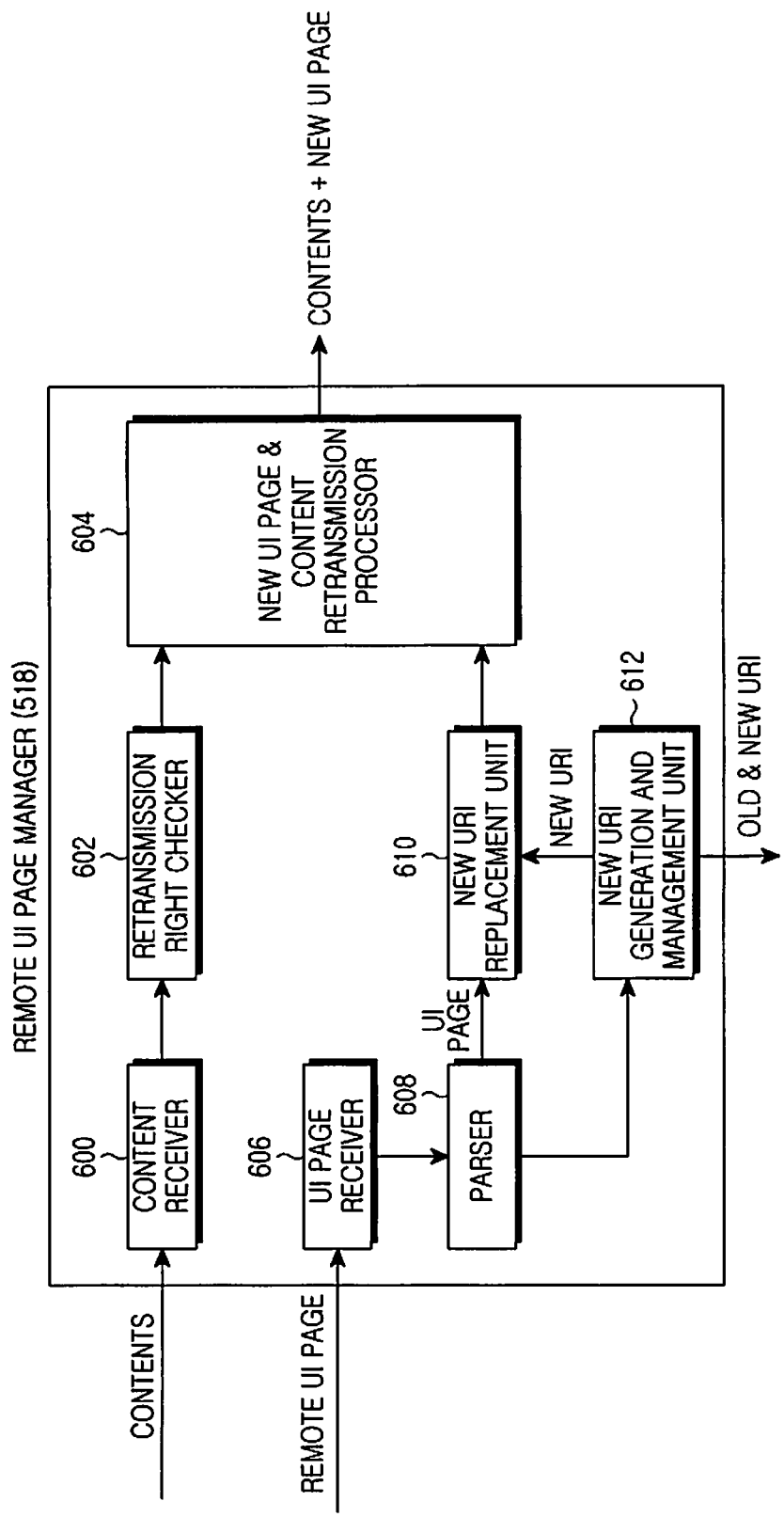
FIG. 6 is a block diagram of a remote UI page manager according to an embodiment of the present invention.

FIG. 6 shows a block diagram of the remote UI page manager 518 according to an embodiment of the present invention.

A content receiver 600 receives content from the RUIS 500, and delivers it to a retransmission right checker 602. The retransmission right checker 602 determines whether it can retransmit the content received from the RUIS 500, and provides the results to a new UI page & content retransmission processor 604. The retransmission right checker 602 determines whether the content received from the RUIS 500 is re-transmittable depending on the digital rights management and security requirements for the content.

A UI page receiver 606 receives a remote UI page from the RUIS 500, and provides it to a parser 608. The parser 608 parses the remote UI page, and transmits an old URI (URI of RUIS) of the remote UI page parsed in the remote UI page, to a new URI generation and management unit 612.

The new URI generation and management unit 612 generates a new URI address (URI address of RUIC1) where the RUIC1 510 will receive the control message and other various request messages sent by the RUIC2 502, and then transmits the new URI address to a new URI replacement unit 610. The new URI replacement unit 610 inserts the generated new URI address into the remote UI page, and transmits the remote UI page through the new UI page & content retransmission processor 604, along with the new processed remote UI page to the RUIC2 502.

The new URI generation and management unit 612 stores mapping information between the old URI and the new URI, and upon receipt of a control message or a request message from the RUIC2 502, converts an address according to the mapping information and forwards the received message to the RUIS 500 or another content server using the converted address.

Figure 7:
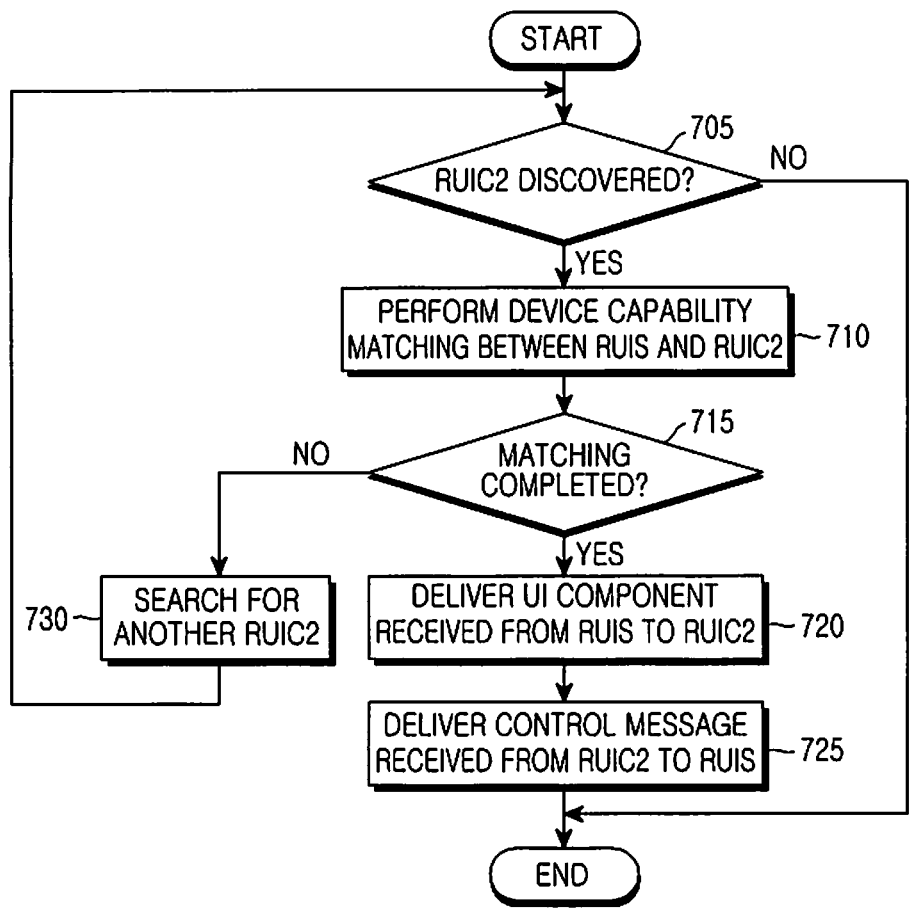
FIG. 7 is a flowchart showing an operation for interfacing between an RUIS and an RUIC2 in an RUIC1 according to an embodiment of the present invention.

FIG. 7 shows an operation interfacing between an RUIS 500 and an RUIC2 502 in an RUIC1 510 according to an embodiment of the present invention.

In step 705, the RUIC1 501 performs a process of discovering the RUIC2 502 in either the PUSH mode or the PULL mode.

Upon discovering the RUIC2 502 in step 705, the RUIC1 510 performs a device capability matching procedure between the RUIS 500 and the RUIC2 502 in step 710. The device capability matching procedure includes a process of transmitting a device capability of the RUIC1 510 itself and a device capability of the RUIC2 502, to the RUIS 500.

If device capability matching has been completed in step 715, the RUIC1 510 delivers a UI component received from the RUIS 500 to the RUIC2 502 in step 720. The UI component may include a remote UI page and content. For example, if the RUIC2 502 can provide a remote UI page or content to the user through the device capability matching procedure of step 710, the RUIS 500 may receive the remote UI page or content corresponding to a device profile of the RUIC2 502, from the RUIC2 502. In step 720, if a remote UI page in the UI component should be delivered to the RUIC2 502, the RUIC1 510 converts a URI address of the RUIS 500, to which control information of the remote UI page is to be delivered, into its own URI address, and transmits a new remote UI page processed to be agreeable with the RUIC2 502, to the RUIC2 502.

In step 725, the RUIC1 510 receives a control message for the transmitted UI component from the RUIC2 502, and transmits the received control message to the RUIS 500.

However, if capability matching has not been completed in step 715, the RUIC1 510 searches for another RUIC2 in step 730, and then returns to step 705 and repeats its succeeding steps 710 to 725.

Figure 8:
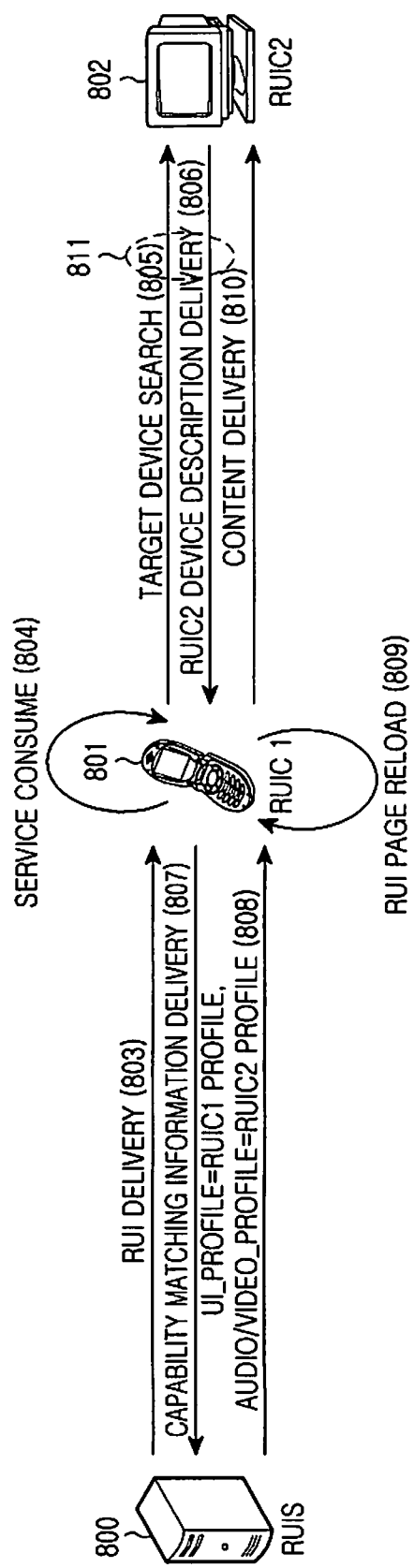
FIG. 8 is a diagram illustrating an example in which only a remote UI page is accessed in an RUIC1 and only content is accessed in an RUIC2 according to an embodiment of the present invention.
Figure 9:
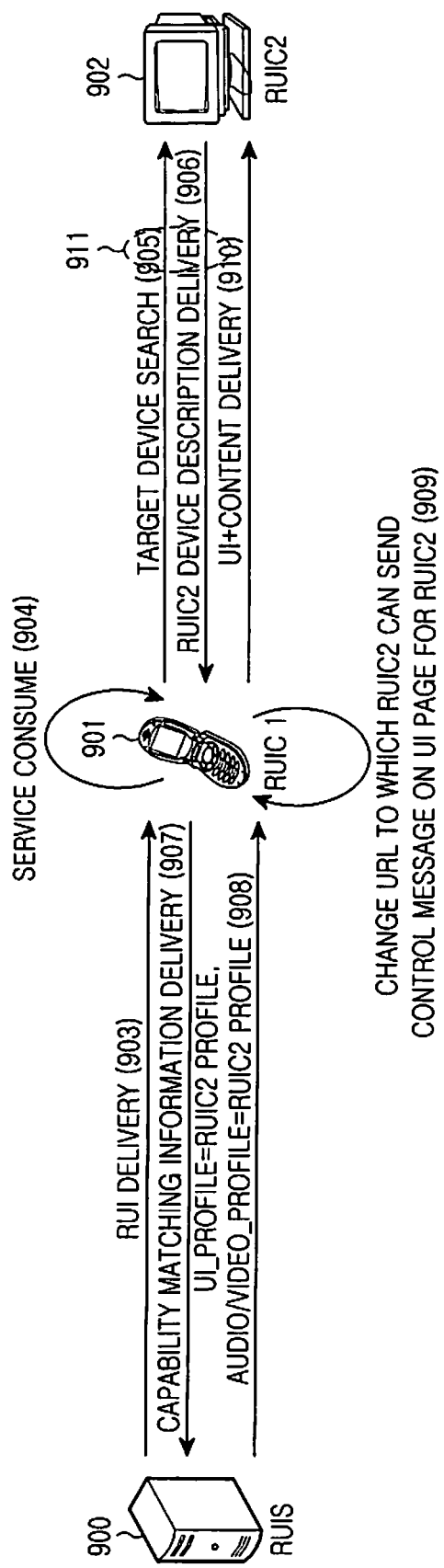
FIG. 9 is a diagram illustrating an example in which both a remote UI page and content are accessed in an RUIC2 according to an embodiment of the present invention.

FIGS. 8 and 9, show one case where a remote UI page and content provided from an RUIS are separately provided to an RUIC1 and an RUIC2, and another case where both the remote UI page and the content are provided to the RUIC2, respectively.

FIG. 8 shows an aspect of the present invention where only a remote UI page is accessed in an RUIC1 801 and only content is accessed in an RUIC2 802. For example, this case may occur when a user, who was consuming content on the RUIC1 801, wants to continuously perform the control operation on the RUIC1 801, and to access only the content on the RUIC2 802 having a screen larger that that of the RUIC1 801. In this case, in a device capability matching process, ui_profile uses information about the RUIC1 801, and audio profile and video_profile use information about the RUIC2 802.

In step 803, the RUIC1 801 receives a remote UI (RUI) page from an RUIS 800. While consuming the RUI page in step 804, the RUIC1 801 searches for the RUIC2 802, or the neighboring device, to which it will forward the content received from the RUIS 800, in step 805. Thereafter, in step 806, the RUIC2 802 transmits its own device description to the RUIC1 801 in response to step 805. Step 811, a combination of steps 805 and 806, may be performed in a discovery process.

In step 807, in order to perform a device capability matching procedure, the RUIC1 801 transmits, to the RUIS 800, device capability matching information including ui_profile of the RUIC1 801 itself and audio/video_profile of the RUIC2 802. In the present invention, transmitting the device capability matching information to the RUIS 800 by the RUIC1 801 may be included in the device capability matching procedure. In step 808, the RUIC1 801 receives, from the RUIS 800, a remote UI page with ui_profile set to a value corresponding to a profile of the RUIC1 801, and content with audio/video_profile set to a value corresponding to a profile of the RUIC2 802.

As for the remote UI page and content received from the RUIS 800, the RUIC1 801 outputs the remote UI page to the user using its display in step 809, and delivers the content to the RUIC2 802 in step 810.

FIG. 9 shows an aspect of the present invention where both a remote UI page and content are accessed in an RUIC2. The example of FIG. 9 is similar to that of FIG. 8. In order for an RUIC1 901 to provide a remote UI page and content to an RUIC2 902, all of ui_profile, audio_profile and video_profile use information about the RUIC2 902 in undergoing a device capability matching process in step 907. Accordingly, FIG. 9 is different from FIG. 8 in that the RUIC1 901 receives, from an RUIS 900, the remote UI page and content having a profile of the RUIC2 902 in step 908. Also, FIG. 9 is different from FIG. 8 in that since a control message should be delivered from the RUIC2 902 to the RUIS 900 via the RUIC1 901, the RUIC1 901 inserts an address, to which the RUIC2 902 will deliver the control message, into the remote UI page in step 909, and delivers both the remote UI page and content to the RUIC2 902 in step 910.

In step 903, the RUIC1 901 receives a remote UI page from the RUIS 900. While consuming the remote UI page in step 904, the RUIC1 901 searches for the neighboring device 902, to which it will deliver the content received from the RUIS 900, in step 905. Thereafter, in step 906, the RUIC2 902 transmits its own device description to the RUIC1 901 in response to step 905. Step 911, a combination of steps 905 and 906, may be performed in a discovery process.

In step 907, in order to perform a device capability matching procedure, the RUIC1 901 transmits, to the RUIS 900, device capability matching information including ui_profile and audio/video_profile of the RUIC2 902. In step 908, the RUIC1 901 receives a remote UI page with ui_profile and content with audio/video_profile from the RUIS 900, both ui_profile and audio/video_profile being set to a value corresponding to the profile of the RUIC2 902.

As for the remote UI page and content received from the RUIS 900, the RUIC1 901 changes in step 909 a URL to which the RUIC2 902 can send a control message on the remote UI page received from the RUIS 900, and then delivers the remote UI page and content to the RUIC2 902 in step 910.

As is apparent from the foregoing description, the present invention can provide service to any RUIC incapable of directly receiving a service from an RUIS, by using a proxy RUIC around the RUIC. In this manner, a user of an RUIC can access a remote UI page and content anytime anywhere, overcoming the limitations of the physical transmission channel environment, and/or the limitations of the service environment, such as the case where providing a service to another RUIC is impossible due to the use of different physical layer interfaces, and the case where despite its possible connection, another RUIC has no right to directly receive the remote UI page and content from the RUIS.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing a User Interface (UI) component to a second Remote User Interface Client (RUIC) in a first RUIC, the method comprising:
   transmitting, by the first RUIC, specific information indicating that the first RUIC can operate as a proxy to RUICs incapable of directly receiving the UI component from a Remote User Interface Server (RUIS);
   upon discovering the first RUIC by the second RUIC among the RUICs, performing, by the first RUIC, a device capability matching procedure between the RUIS and the second RUIC;
   after completion of the device capability matching procedure, providing, by the first RUIC, the second RUIC with a UI component received from the RUIS and processed for the second RUIC based on the device capability matching procedure; and
   delivering, by the first RUIC, control information for the UI component from the second RUIC to the RUIS.

2. The method of claim 1, wherein performing the device capability matching procedure comprises transmitting, to the RUIS, profile information of the second RUIC, acquired from a device description received from the second RUIC, and profile information of the first RUIC.

3. The method of claim 2, wherein the UI component comprises at least one of a remote UI page and content.

4. The method of claim 3, wherein providing the UI component to the second RUIC comprises:
   if the second RUIC can utilize the remote UI page, providing the second RUIC with the at least one of the remote UI page and content according to whether the second RUIC has a capability to utilize the at least one of the remote UI page and the content.

5. The method of claim 4, wherein if the second RUIC can utilize the remote UI page, the UI component includes a remote UI page having the profile information of the second RUIC, and if the second RUIC can utilize the content, the UI component includes content having the profile information of the second RUIC.

6. The method of claim 1, wherein the processed UI component is the UI component after being processed for compatibility with the second RUIC.

7. A first Remote User Interface Client (RUIC) device for providing a User Interface (UI) component to a second RUIC, the first RUIC device comprising:

an available service list transmitter for transmitting specific information indicating that the first RUIC can operate as a proxy to RUICs incapable of directly receiving the UI component from a Remote User Interface Server (RUIS);

a UI control module for performing a device capability matching procedure between the RUIS and the second RUIC upon discovering the first RUIC by the second RUIC from among the RUICs;

a remote UI page manager for receiving the UI component from the RUIS, and if the device capability matching procedure is completed, delivering to the second RUIC a UI component received from the RUIS and processed for the second RUIC based on the device capability matching procedure; and a message relay unit for delivering control information for the UI component from the second RUIC to the RUIS.

8. The first RUIC device of claim 7, wherein the available service list transmitter transmits information about a list of services available for the second RUIC.

9. The first RUIC device of claim 7, wherein the UI control module receives, from the second RUIC, specific information indicating whether the second RUIC can receive the UI component provided from the RUIS.

10. The first RUIC device of claim 7, wherein the UI control module performs the device capability matching procedure using profile information of the second RUIC, acquired from a device description received from the second RUIC, and profile information of the first RUIC.

11. The first RUIC device of claim 10, wherein the UI component comprises at least one of a remote UI page and content.

12. The first RUIC device of claim 11, wherein if the second RUIC can utilize the remote UI page, the remote UI page manager delivers the at least one of the remote UI page and content to the second RUIC according to whether the second RUIC has a capability to utilize the at least one of the remote UI page and the content.

13. The first RUIC device of claim 12, wherein if the second RUIC can utilize the remote UI page, the UI component includes a remote UI page having the profile information of the second RUIC, and if the second RUIC can provide the content, the UI component includes content having the profile information of the second RUIC.

14. The first RUIC device of claim 7, the processed UI component is the UI component after being processed for compatibility with the second RUIC.

* * * * *